United States Patent
Castagna et al.

(10) Patent No.: US 12,389,831 B2
(45) Date of Patent: Aug. 19, 2025

(54) ROUND BALER NET WRAP

(71) Applicant: Novatex Italia S.p.A., Oggiono LC (IT)

(72) Inventors: Natale Castagna, Oggiono LC (IT); Marco Casati, Oggiono LC (IT)

(73) Assignee: Novatex Italia S.p.A., Oggiono LC (IT)

( * ) Notice: Subject to any disclaimer, the term of this patent is extended or adjusted under 35 U.S.C. 154(b) by 0 days.

(21) Appl. No.: 18/841,468

(22) PCT Filed: Mar. 14, 2023

(86) PCT No.: PCT/IB2023/052465
§ 371 (c)(1),
(2) Date: Aug. 26, 2024

(87) PCT Pub. No.: WO2023/175500
PCT Pub. Date: Sep. 21, 2023

(65) Prior Publication Data
US 2025/0160258 A1    May 22, 2025

(30) Foreign Application Priority Data
Mar. 15, 2022   (IT) .................. 102022000005006

(51) Int. Cl.
*A01F 15/00* (2006.01)
*A01F 15/07* (2006.01)

(52) U.S. Cl.
CPC .... *A01F 15/071* (2013.01); *A01F 2015/0745* (2013.01)

(58) Field of Classification Search
CPC ............... A01F 15/07; A01F 15/071; A01F 2015/0745; A01F 15/145; A01F 15/0705; B65B 11/04; B65B 27/12; B65B 63/02; B65B 13/26
USPC ................................. 53/203, 438, 450, 459
See application file for complete search history.

(56) References Cited

U.S. PATENT DOCUMENTS

| | | | |
|---|---|---|---|
| 2018/0340277 A1* | 11/2018 | Karatzis ................. | D04B 27/06 |
| 2020/0385902 A1* | 12/2020 | Karatzis ................. | D04B 21/10 |

FOREIGN PATENT DOCUMENTS

| | | | |
|---|---|---|---|
| AU | 2012203681 | 7/2013 | |
| EP | 0891698 | 1/1999 | |
| EP | 0891698 A2 * | 1/1999 | ............. D04B 21/12 |
| EP | 2630137 | 8/2013 | |
| WO | WO 2021166276 | 8/2021 | |

OTHER PUBLICATIONS

International search report and written opinion dated Jul. 5, 2023; Application No. PCT/IB2023/052465; 13 pages.

* cited by examiner

*Primary Examiner* — Jacob A Smith
(74) *Attorney, Agent, or Firm* — Erik J. Overberger; RANKIN, HILL & CLARK LLP

(57) ABSTRACT

A round baler net wrap (1) comprises a plurality of first chains (2) extending along a longitudinal direction (X-X), a plurality of second chains each arranged between two first chains (2) and defined by a plurality of segments (4), each fixed to two adjacent first chains (2). The net (1) is characterized in that each first chain (2) is spaced from the adjacent first chain (2) by at least 5.08 centimetres.

12 Claims, 2 Drawing Sheets

ROUND BALER NET WRAP

TECHNICAL FIELD

The present disclosure relates to a round baler net wrap. The net is used in round baler machines to collect and compress agricultural products such as fodder and straw.

BACKGROUND ART

Wide-mesh nets for round balers are known in the state of the art. A net of known type comprises a plurality of first chains, parallel to each other. Each first chain consists of a plurality of meshes woven and oriented in the winding direction of the net. Furthermore, the net comprises second threads, connected to the first chains at a braiding point. The nets of the prior art comprise between two and six knots between two consecutive braiding points.

In the nets of the prior art, the distance between two consecutive first chains is 5.08 cm (2"). Furthermore, the number of knots per metre of net length is greater than 33.

The nets of the prior art can have different widths, the most common are 123 cm (48") wide and comprise twenty-five first chains. The first chains of the nets of the prior art are obtained by simultaneously weaving two threads of plastic material, usually HDPE.

US 2018/340277 A1 discloses a net comprising a plurality of warp threads and weft threads connected to the warp threads so as to form a zigzag pattern. The warp threads are spaced from each other for example by a distance of 50.8 mm.

AU 2012 203 681 A1 and US 2020/385902 A1 disclose a net comprising warp threads and zigzag connecting threads.

EP 2 630 137 discloses a mixture of HDPE and PP comprising additives and stabilizers.

WO2021166276A1 discloses a resin composition with a stretch coefficient of 8:1.

OBJECT OF THE INVENTION

Disadvantageously, the round baler nets of the prior art can have problems concerning material recycling. In fact, after use, the net has a high component of contaminants, for example soil and residues of previously contained fodder, which remain trapped in the meshes of the net. These pollutants, especially the organic ones, are difficult to eliminate during the mechanical recycling process of the net, making it difficult to obtain a recycled material of sufficient quality.

In this context, the technical task underlying the present disclosure is to propose a round baler net wrap which overcomes the drawbacks of the prior art mentioned above.

In particular, it is an object of the present disclosure to provide a round baler net wrap capable of decreasing the content of contaminants trapped in the net and facilitating the cleaning operations of the net itself from the residues described above.

The mentioned technical task and the specified aims are substantially achieved by a round baler net wrap, comprising the technical specifications set out in one or more of the appended claims.

Such a round baler net wrap solves the technical problem in that, for the same width, it comprises fewer first chains. Furthermore, such a net for balers comprises a lower number of knots per metre with respect to the nets of the known art.

Thereby, the amount of fodder retained by the net is reduced, reducing the contaminants to be eliminated during the recycling step.

Advantageously, the amount of fodder lost during net removal during the step of feeding livestock is reduced, increasing the yield of the fodder stored in bales.

Still advantageously, using fewer chains to produce the round baler net wrap results in increased efficiency during production.

Still advantageously, the nets are made more resistant, since it has fewer knots per metre, which are the points of greatest fragility of the net.

BRIEF DESCRIPTION OF THE FIGURES

For a better understanding of the following detailed description, some embodiments of the invention are illustrated in the accompanying drawings, in which.

DETAILED DESCRIPTION

Figure 1:
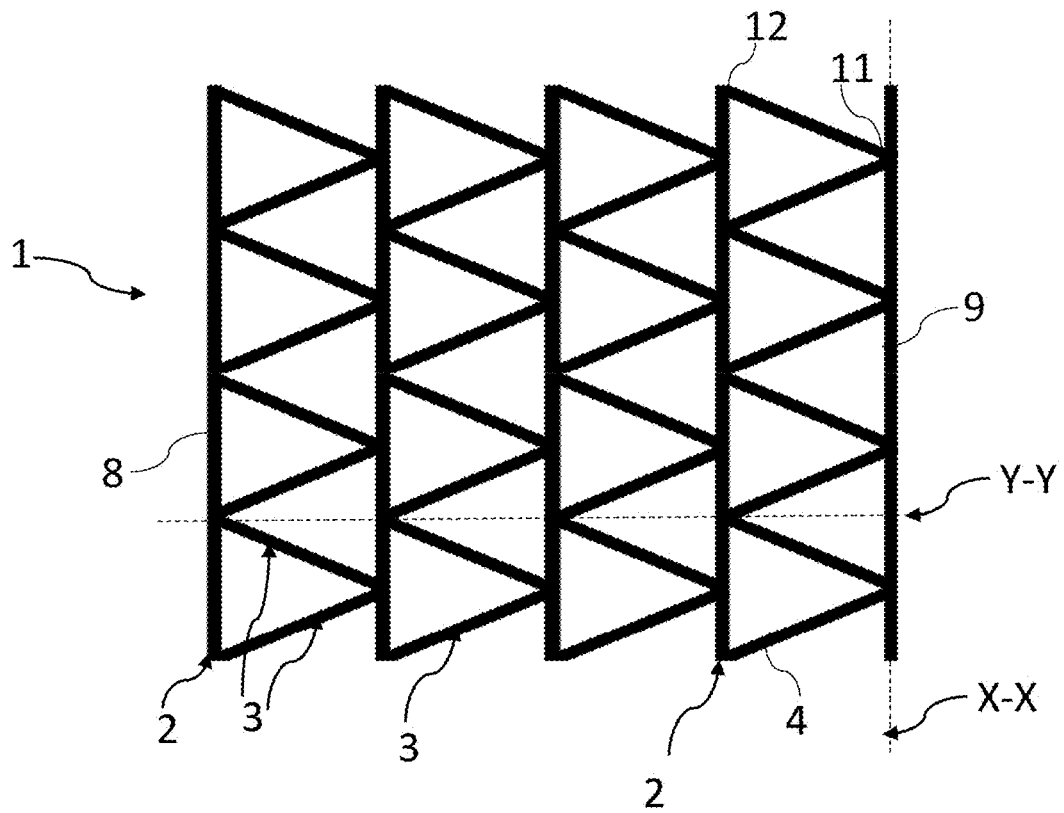
FIG. 1 shows a schematic top view of a round baler net wrap.
Figure 2:
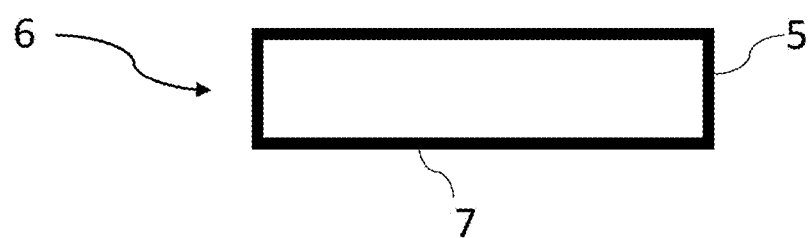
FIG. 2 shows a section of a detail of the round baler net wrap of FIG. 1.

With reference to the mentioned figures, the number 1 generally indicates a round baler net wrap in accordance with the present disclosure.

The net 1 comprises a plurality of chains. In particular, the net 1 comprises a plurality of first chains 2 and second threads 3.

It should be noted that the first chains 2 extend along a longitudinal direction X-X. Each first chain 2 is spaced from the adjacent first chain 2 by at least 5.08 centimetres. In more detail, each first chain 2 is spaced from the adjacent first chain 2 by 7.69 centimetres.

Each first chain 2 comprises one or more knitted threads. The knitted threads form a plurality of meshes 13. Two consecutive meshes 13 are joined respectively at a knot 14. The net 1 comprises a number of knots 14 per metre lower than 33. In the preferred embodiment, the number of knots 14 per metre is equal to 23. Advantageously, the net 1 is stronger because it has fewer knots 14 which represent the points of weakness of each first chain 2.

Each of the second threads 3 is arranged between two first chains 2. Furthermore, each second thread 3 is configured to connect two adjacent first chains 2. It should be noted that each second thread 3 is defined by a plurality of segments 4 and that each segment 4 connects two adjacent first chains 2.

In greater detail, each segment 4 comprises a first 11 and a second end 12 and each end 11, 12 is connected to the respective first chain 2 of the two adjacent first chains 2. Preferably, each first 11 and second end 12 is connected to the respective first chain 2 by braiding. That is, each of the first 11 and second ends 12 of each segment 4 is connected to the respective first chain 2 at a braiding point 15. In an embodiment, at least one knot 14 is present between two consecutive braiding points 15, along a first chain 2. In the preferred embodiment, there is only one knot 14 between two consecutive braiding points 15.

Figure 3:
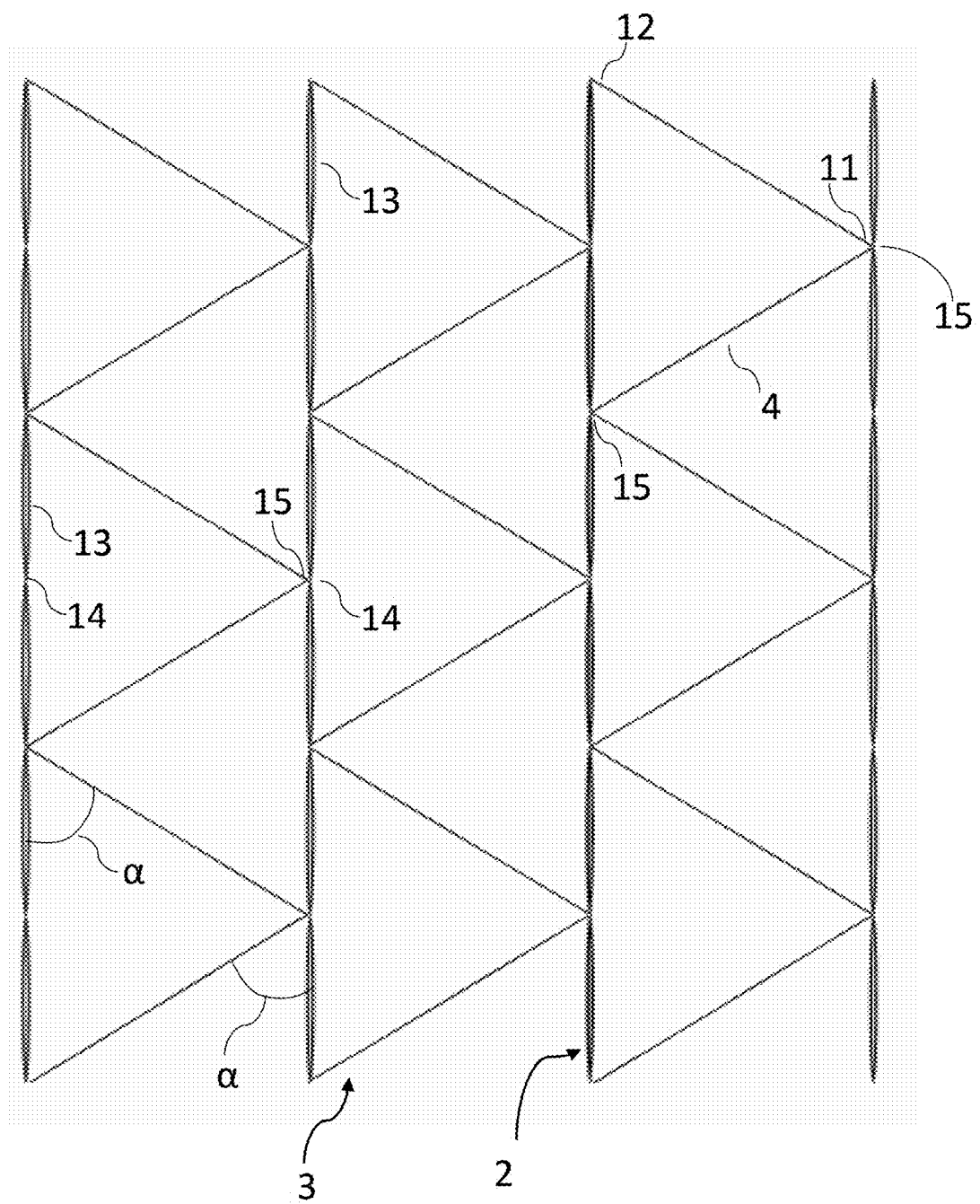
FIG. 3 shows a schematic top view of a preferred embodiment of a round baler net wrap.

That is, with particular reference to FIG. 3, in the preferred embodiment, between two braiding points 15 of a single first chain 2 there are two consecutive meshes 13, connected by a knot 14.

It should be noted that said knot 14 comprised between the two braiding points 15 of a first chain 2 is also a braiding point 15, since at such a knot 14 it is connected to two further segments 4 at the first 11 or second ends 12.

It should be noted that each segment 4 is configured to form a connection angle α with a first chain 2 comprised between 55° and 65°, preferably equal to 60°.

It should be noted that two consecutive segments 4 form an equilateral triangle with a respective first chain 2.

In greater detail, the net 1 comprises a first 8 and a second edge 9, which extend along the longitudinal direction X-X. It should be noted that the first 8 and the second edge 9 are defined by a first chain 2. Furthermore, the first 8 and the second 9 edge are spaced along a transverse direction Y-Y, perpendicular to the longitudinal direction X-X, by a distance comprised between 90 and 170 centimetres. In the preferred embodiment, the distance between the first 8 and the second edge 9 is 123 centimetres.

Preferably, the net 1 is wound on a support, not shown in the figure, which has a main extension direction. In use, the main extension direction of the support is arranged parallel to the transverse direction Y-Y of the net.

In greater detail, the net comprises a number of first chains 2, along the longitudinal direction Y-Y, less than 25. It should be noted that, in the preferred embodiment, the net 1 comprises a number of first chains 2 along the longitudinal direction Y-Y equal to 17.

In a preferred embodiment, each first chain 2 is defined by a single first thread. Optionally, in the preferred embodiment, the first threads of the first chain 2 and the second threads 3 are equal.

In an alternative embodiment, the first chains 2 are defined by two first threads.

Each first and second thread is made from a mixture of high-density polyethylene (HDPE), polypropylene (PP), additives and stabilizers. Preferably, the high-density polyethylene is polyethylene for textile applications. Preferably, the amount of additives and stabilizers is chosen as a function of the geographical area in which the net 1 will be employed. It should be noted that the mixture for the first and second threads is made so as to obtain a degree of toughness and resistance to UV rays of the threads so that the net 1 for balers is capable of maintaining the compactness of the fodder preferably for at least one year.

In the preferred embodiment, each first and second thread 3 has a rectangular section 6 with a base dimension 7 and a height dimension 5. The section 6 of the first thread has a ratio between the base dimension 7 and the height dimension 5 comprised between 22:1 and 37:1. The section 6 of the second thread 3 has a ratio between the base dimension 7 and the height dimension 5 comprised between 45:1 and 76:1. In the preferred embodiment, the section 6 of the first thread is equal to 28.60:1, while the section 6 of the second thread is equal to 60.60:1.

In preferred embodiment, each first thread has a stretch coefficient comprised between 6:1 and 9:1. In the preferred embodiment, each second thread 3 has a stretch coefficient comprised between 6:1 and 8.5:1. In the context of the present disclosure, "stretch coefficient" means the ratio of a length of the thread after stretching and a length of the thread before stretching.

It should be noted that, by changing the ratio between the first base dimension 7 and the first height dimension 5 of the first rectangular section 6 and the mixture of each first thread, it is possible to further reduce the number of the first chains 2 along the transverse direction Y-Y. That is, by modifying the thread count and the mixture of each first thread it is possible to reduce the number of first chains 2 along the transverse direction Y-Y.

The invention claimed is:

1. Round baler net wrap, comprising:
   a plurality of first chains each defined by at least a first thread and extending along a longitudinal direction,
   a plurality of second threads arranged between two first chains, each second thread being defined by a plurality of segments, each segment being fixed to two adjacent first chains,
   characterised in that each first chain is spaced from the adjacent first chain by at least 5.08 centimetres and comprises a number of knots per metre along each first chain of less than 33.

2. Round baler net wrap according to claim 1, wherein each first chain is spaced from the adjacent first chain by 7.69 centimetres.

3. Round baler net wrap according to claim 1, wherein each first chain has a number of knots per metre equal to 23.

4. Round baler net wrap according to claim 1, wherein each second thread comprises a plurality of segments configured to connect two adjacent first chains and to form a connection angle equal to 60° with a first chain.

5. Round baler net wrap according to claim 4, wherein each segment comprises a first and a second end, connected to the respective first chain of the two adjacent first chains at a braiding point, at least one knot being present between two consecutive braiding points along a first chain, preferably a single knot.

6. Round baler net wrap according to claim 1, wherein each first chain is defined by a single first thread.

7. Round baler net wrap according to claim 6, wherein each first thread has a first rectangular section, with a ratio between a first base dimension and a second height dimension of the section comprised between 22:1 and 37:1.

8. Round baler net wrap according to claim 1, wherein each second thread has a second rectangular section, with a ratio between a second base dimension and a second height dimension of the section comprised between 45:1 and 76:1.

9. Round baler net wrap according to claim 6, wherein each first and second thread is made of a mixture of HDPE, PP, additives and stabilizers.

10. Round baler net wrap according to claim 6, wherein each first thread is characterized by a stretch coefficient comprised between 6:1 and 9:1.

11. Round baler net wrap according to claim 1, wherein each second thread is characterized by a stretch coefficient between 6:1 and 8.5:1.

12. Round baler net wrap according to claim 1, wherein the net comprises along a transverse direction, perpendicular to the longitudinal direction, at most 17 first chains.

* * * * *